(12) United States Patent
Bachon

(10) Patent No.: US 11,498,319 B2
(45) Date of Patent: Nov. 15, 2022

(54) COMPOSITE FILM

(71) Applicant: EWALD DÖRKEN AG, Herdecke (DE)

(72) Inventor: Thomas Bachon, Düsseldorf (DE)

(73) Assignee: EWALD DÖRKEN AG, Herdecke (DE)

(*) Notice: Subject to any disclaimer, the term of this patent is extended or adjusted under 35 U.S.C. 154(b) by 0 days.

(21) Appl. No.: 17/284,544

(22) PCT Filed: Sep. 25, 2019

(86) PCT No.: PCT/EP2019/075797
§ 371 (c)(1),
(2) Date: Apr. 12, 2021

(87) PCT Pub. No.: WO2020/088851
PCT Pub. Date: May 7, 2020

(65) Prior Publication Data
US 2021/0308998 A1    Oct. 7, 2021

(30) Foreign Application Priority Data

Oct. 31, 2018 (DE) .................... 10 2018 008 583.0

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/022* (2013.01); *B32B 5/18* (2013.01); *B32B 7/12* (2013.01);
(Continued)

(58) Field of Classification Search
None
See application file for complete search history.

(56) References Cited

U.S. PATENT DOCUMENTS

| 4,282,076 A | 8/1981 | Boynton |
| 5,064,802 A | 11/1991 | Stevens et al. |

(Continued)

FOREIGN PATENT DOCUMENTS

| DE | 102005035246 A1 | 2/2007 |
| DE | 102013014920 A1 | 1/2015 |

(Continued)

OTHER PUBLICATIONS

Türk, Wolfgang "Römpp Lexikon Chemie, Catchword: Bikomponentenfasern" Feb. 2005.
(Continued)

*Primary Examiner* — Chinessa T. Golden
(74) *Attorney, Agent, or Firm* — Jason H. Vick; Sheridan Ross, PC

(57) ABSTRACT

The invention relates to a composite film (1), preferably intended for use in the construction industry and/or preferably for use as a construction film, having at least one functional layer (2), at least one outer protective layer (3) and at least one inner protective layer (4), the functional layer (2) being arranged between the outer protective layer (3) and the inner protective layer (4). According to the invention, it is provided that the functional layer (2) is formed as at least a single-layer membrane layer, that the outer protective layer (3) and the inner protective layer (4) are formed as a nonwoven layer comprising a polyolefin, and that the outer protective layer (3) and/or the inner protective layer (4) comprises at least one bicomponent fiber (5) having a first component (6) and a second component (7), the first component (6) comprising a first polymer and the second component (7) comprising a second polymer as constituent.

29 Claims, 5 Drawing Sheets

Figure 1:
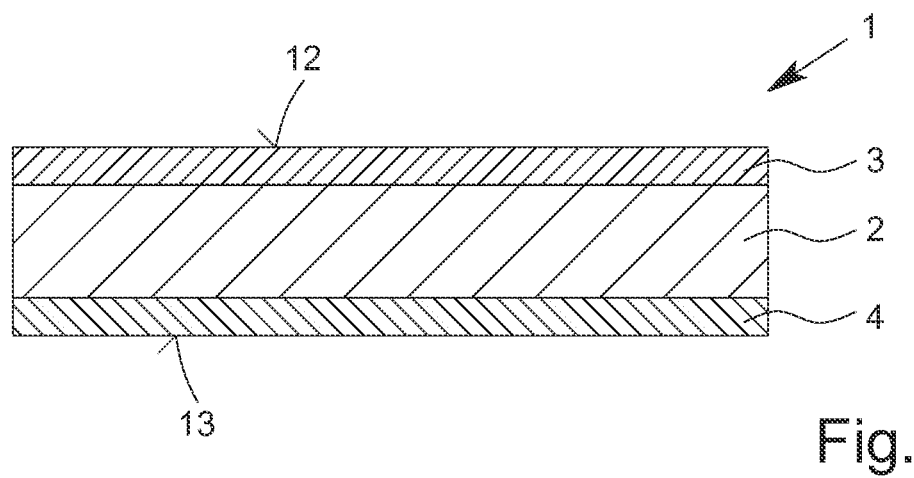

(51) Int. Cl.
  *B32B 5/18* (2006.01)
  *B32B 7/12* (2006.01)
  *B32B 27/18* (2006.01)
  *B32B 27/40* (2006.01)

(52) U.S. Cl.
  CPC ............ *B32B 27/18* (2013.01); *B32B 27/40* (2013.01); *B32B 2262/0253* (2013.01); *B32B 2262/124* (2021.05); *B32B 2266/0278* (2013.01); *B32B 2307/3065* (2013.01); *B32B 2307/5825* (2013.01); *B32B 2307/718* (2013.01); *B32B 2307/7246* (2013.01); *B32B 2307/73* (2013.01)

(56) References Cited

U.S. PATENT DOCUMENTS

| | | | |
|---|---|---|---|
| 5,374,696 | A | 12/1994 | Rosen et al. |
| 5,723,217 | A | 3/1998 | Stahl et al. |
| 2004/0097157 | A1* | 5/2004 | Cosentino ............... B32B 27/12 428/424.8 |
| 2008/0227350 | A1* | 9/2008 | Schroer ................ E04D 12/002 156/273.1 |
| 2009/0227164 | A1* | 9/2009 | Broch-Nielsen ....... D06N 3/045 427/430.1 |
| 2013/0239283 | A1* | 9/2013 | Yokoyama ................ D01F 8/06 2/9 |
| 2015/0017864 | A1* | 1/2015 | Schroer .................... D01F 8/06 442/361 |
| 2015/0017865 | A1 | 1/2015 | Shröer et al. |
| 2017/0306628 | A1* | 10/2017 | Simonis .................. B32B 25/08 |
| 2020/0376796 | A1 | 12/2020 | Flaig et al. |

FOREIGN PATENT DOCUMENTS

| | | | |
|---|---|---|---|
| EP | 1772259 | A1 | 4/2007 |
| EP | 2644763 | A1 | 10/2013 |
| EP | 2826896 | A1 | 1/2015 |
| EP | 3235637 | A1 | 10/2017 |
| WO | WO 2008/128967 | | 10/2008 |
| WO | WO-2008128967 | A1 * | 10/2008 ............ B32B 27/12 |
| WO | WO 2018/184815 | | 10/2018 |

OTHER PUBLICATIONS

International Preliminary Report on Patentability for International Application No. PCT/EP2019/075797, dated May 14, 2021.
International Search Report for International Application No. PCT/EP2019/075797, dated Dec. 19, 2019.
Written Opinion for International Application No. PCT/EP2019/075797, dated Dec. 19, 2019.

* cited by examiner

COMPOSITE FILM

CROSS-REFERENCE TO RELATED APPLICATIONS

This application is a national stage application under 35 U.S.C. 371 of PCT Application No. PCT/EP2019/075797 having an international filing date of 25 Sep. 2019, which designated the United States, which PCT application claimed the benefit of German Application No. 10 2018 008 583.0, filed 31 Oct. 2018, each of which are incorporated herein by reference in their entirety.

The invention relates to a composite film, preferably intended for use in the construction industry and/or preferably for use as a construction sheet. The composite film has at least one functional layer. In addition, the composite film has at least one outer protective layer and at least one inner protective layer. The functional layer is arranged between the outer protective layer and the inner protective layer.

Composite films used in the construction industry are used to protect buildings, building materials and/or for cover, in particular of buildings. In particular, composite films can be used as facade membranes, construction films and/or roof membranes.

According to the invention, however, the composite film can also be used in other areas, for example in agriculture, as a geotextile and/or in the packaging industry.

Ultimately, the composite film can serve to preserve the value of goods, in particular buildings and/or building materials. For example, the composite film can be used to protect against the elements, in particular to protect against rain, snow, moisture, cold, heat and/or wind. Consequently, the composite film may also be referred to as a protective film.

Various composite films are known from practice that have a multilayer structure and/or a structure consisting of several layers. However, these films have a number of disadvantages. For example, the multilayer composite films known in practice do not succeed in providing the mechanical properties required for the respective application at a high water vapor permeability—i.e. at an Sd value of less than 0.1 m—while ensuring a good bond between the individual layers.

The functional layer, which is known in practice, ensures water tightness, water vapor permeability and/or wind tightness for the composite film. The protective layers on the outside serve to protect the functional layer, especially in the event of mechanical stress. However, this protection cannot usually be ensured for a longer period, in particular for more than 10 years, while maintaining a high mechanical stability of the protective layers. In addition, protective layers that bond well with other layers of the composite film are associated with high manufacturing costs.

It is now the object of the present invention to avoid the aforementioned disadvantages of the prior art.

According to the invention, the aforementioned object is solved in a composite film of the type mentioned above in that the functional layer is formed as at least a single-layer membrane layer, in that the outer protective layer and the inner protective layer are formed as a nonwoven layer comprising polyolefin, and in that the outer protective layer and/or the inner protective layer comprises at least one bicomponent fiber having a first component and a second component, the first component comprising a first polymer and the second component comprising a second polymer as a constituent.

The outer protective layer can be understood as the protective layer facing the weather side—provided that the composite film is used for protection against the weather. In principle, it is also conceivable that the composite film is not used for weather protection. In this case, the arrangement of the outer protective layer and the inner protective layer would be interchangeable. In particular, however, the inner protective layer faces the goods to be protected, for example the interior of the building, the building material or the like.

According to the invention, the composite film exhibits very good weathering stability—with simultaneous high UV stability. Thus, the composite film can be used for a longer period of time, while ensuring at least substantially the required weathering properties over this period. In particular, the composite film has a service life of longer than 10 years, preferably between 15 and 60 years.

By using the bicomponent fiber in at least one protective layer, the overall strength of the composite film can be significantly increased, preferably by at least 10%, more preferably between 20% to 70%.

The protective layer comprising the bicomponent fiber is advantageous compared with nonwoven layers known from the prior art, in particular polypropylene or polyethylene nonwoven layers, in that it ensures increased mechanical strength. In addition, the protective layer comprising the bicomponent fiber can be hydrophobic (water-repellent). Improved strength is shown to be particularly advantageous in the case of longer-term and/or increased mechanical stress on the composite film. If, for example, the composite film is used as a roofing sheet, in particular underlayment and/or sarking membrane, it is exposed to mechanical stresses not only during installation but also when the roof is walked on, for example by roofers.

In a particularly preferred embodiment, the functional layer is designed as a monolithic membrane layer. A monolithic membrane layer is understood to mean in particular a closed-cell and/or pore-free layer of a membrane. Monolithic membrane layers can in particular ensure particularly good protection against driving rain while at the same time being open to diffusion. Unlike the conventional microporous membrane layer, moisture transport can take place actively along the molecular chains by diffusion.

Furthermore, a membrane layer is understood to be a layer of this type that exhibits selective permeability. Membranes can be of different types and, in particular, can take the form of films or textiles. Membrane layers ensure, for example, when used as or in a subroof membrane, that the external influences of the weather do not have a damaging effect on the interior of the building.

Preferably, the functional layer has plastic and/or synthetic resin as material and/or consists thereof. Furthermore, in particular an elastomeric and/or a thermoplastic material is provided as material for the functional layer, preferably polyurethane plastic, in particular thermoplastic polyurethane (TPU). Preferably, the functional layer is made of thermoplastic polyurethane. A TPU film exhibits high mechanical stability and is in particular at least substantially resistant to weathering and/or environmental influences.

In addition, the functional layer can have a grammage and/or basis weight of less than 100 $g/m^2$. In particular, the grammage is between 1 $g/m^2$ to 70 $g/m^2$, and more preferably between 3 $g/m^2$ to 40 $g/m^2$. Particularly preferably, the grammage of the functional layer is between 4 $g/m^2$ to 30 $g/m^2$, and more preferably between 5 $g/m^2$ to 25 $g/m^2$.

In a further particularly preferred embodiment of the invention, it is provided that the functional layer has at least two layers of membrane layers. On the one hand, these membrane layer layers can be formed differently. In addition, on the other hand, at least two membrane layer layers can be formed at least substantially identically. In particular, in the case of a three-layer structure of the functional layer, it can be provided that the outer layers enclosing a central layer are at least substantially identically formed. By identical formation is to be understood in particular that the membrane layers have the same surface properties and/or the same material and/or the same material composition. Finally, the identical membrane layers may have the same functional design. For example, however, the grammage of the identically formed membrane layers may differ from one another by less than 5 g/m$^2$.

Preferably, the membrane layers may have the same or a different proportion of additives, in particular with respect to the relative additive amount and/or the type or material of the additive(s). In particular, at least two membrane layer layers, preferably the outer membrane layer layers, may have the at least substantially same or identical material, preferably TPU, with a different additive addition. The additive addition can be shown or reflected in a different amount or mass of the additive—relative to the volume and/or the area of the membrane layer and/or the total amount—and/or in a different additive composition.

It is particularly preferred that at least one membrane layer of the functional layer, in particular an outer membrane layer preferably facing the outer protective layer and/or the inner protective layer, comprises as material thermoplastic copolyester (TPEE) and/or thermoplastic polyurethane (TPU) and/or consists thereof. Furthermore, in a preferred embodiment of the invention, the functional layer may be formed from TPEE layers and/or TPU layers and/or from TPEE layers as well as TPU layers. In particular, the TPEE layers and/or the TPU layers and/or the membrane layers of the functional layer are firmly bonded to one another, in particular inseparably. TPEE layers have a good and/or high tear propagation resistance with a high strength as well as stiffness while ensuring resistance to liquids. A monolithic TPEE membrane is particularly well extrudable and also suitable for thin films. In addition, a TPEE membrane can enable extrusion lamination with PP nonwovens. In particular, a membrane film comprising TPEE is suitable for a multilayer coextruded film, especially a coextruded composite film, and makes sense from a technical point of view.

Thermoplastic polyurethane is particularly intrinsically flame retardant and exhibits good long-term aging behavior, preferably for service lives greater than 10 years.

In a further preferred embodiment, it is provided that the material of the functional layer, in particular the thermoplastic polyurethane, has a proportion of at least 10%, preferably from 15% to 100%, more preferably from 20% to 70%, of material originating from renewable raw materials. Renewable raw materials are to be understood in particular as organic raw materials that originate from agricultural and forestry production and are used by humans specifically for further application purposes outside the food and feed sector.

In a further preferred embodiment, it is provided that at least one outer membrane layer layer and/or one inner membrane layer layer of the multilayer functional layer comprises and/or consists of a foamed polymer. During the extrusion lamination process, the outerside foamed layer of the functional layer can achieve an interlocking with the outer protective layers—that is, the outer and/or the inner protective layer—as a result of which the composite adhesion with the protective layers, in particular the protective layers formed as non-woven polypropylene layers, is improved. Preferably, the outer membrane layer of the functional layer comprising the foamed polymer is thus bonded to the outer and/or inner protective layer, at least also by interlocking. The interlocking can be caused by slower cooling due to the foamed polymer layer. Kneading swirls in the pressing plant—which are caused during production, especially during calendering, of the composite film—can also contribute to the interlocking. In particular, the foamed polymer layer penetrates into open pores on the outer side of the protective layer facing the foamed polymer layer, thus enabling a firm bond to the protective layers.

An inner membrane layer comprising a foamed polymer may be provided to ensure nail tightness.

In particular, the outer protective layer and/or the inner protective layer can be in the form of a nonwoven layer, preferably thermobonded or needle-jet or wet-jet bonded. The nonwoven layer may be a polyolefinic nonwoven, in particular a nonwoven layer comprising polypropylene and/or consisting thereof is provided. Very particularly preferred is the formation of the outer protective layer and/or the inner protective layer as a polypropylene needle punched nonwoven layer. The nonwoven layer ensures in particular the mechanical properties of the composite film and also guarantees protection of the functional layer enclosed between the protective layers.

Particularly preferably, the outer protective layer and/or the inner protective layer is formed as a spunbonded layer. A spunbonded nonwoven fabric and/or a spunbonded nonwoven layer has a nonwoven fabric made of fibers with at least essentially unlimited length—that is, with long fibers.

Preferably, the fibers of the spunbonded layer provided in the outer and/or inner protective layer are bicomponent fibers. Thus, the spunbonded layer made of continuous fibers can be made of bicomponent continuous fibers.

Moreover, in another preferred embodiment of the invention, the basis weight and/or grammage of the outer protective layer and/or the inner protective layer may be less than or equal to 250 g/m$^2$. Preferably, the aforementioned grammage is between 1 g/m$^2$ to 250 g/m$^2$, further preferably between 10 g/m$^2$ and 150 g/m$^2$, preferably between 20 g/m$^2$ to 120 g/m$^2$ and in particular between 30 g/m$^2$ and 100 g/m$^2$. The grammage of the protective layers is selected in such a way that the required properties of the composite film, in particular elasticity, stability, tear resistance and/or tear propagation resistance, can still be adequately ensured with the lowest possible total grammage of the composite film, wherein the composite film providing mechanical protection of the functional layer on account of the protective layers on the outside, which can likewise be referred to as carrier layers.

The inner and outer protective layers may have a different grammage and/or a different basis weight, material composition and/or bicomponent fibers that differ from one another. Alternatively or additionally, it can be provided that the inner and the outer protective layer are at least substantially identical and/or identically formed.

An identical design of the protective layers is to be understood in particular as meaning that the protective layers have the same surface properties, the same material and/or material composition and/or the same grammage. In particular, the outer and inner protective layers can have the same function, in particular wherein the grammage of the identical protective layers differs by less than 5 g/m$^2$.

Preferably, a symmetrical structure of the layers of the composite film is provided.

Furthermore, the outer protective layer and/or the inner protective layer can be designed as a mechanically, chemically and/or thermally, preferably thermally, bonded nonwoven layer. A nonwoven layer is characterized in particular by low manufacturing costs and high mechanical resistance to external influences.

Preferably, the functional layer is firmly bonded to the outer protective layer and/or the inner protective layer. In particular, the outer protective layer and/or the inner protective layer may be bonded to the functional layer. Consequently, an adhesive layer may be provided between the functional layer and at least one protective layer. The bonding of the layers may be performed during the manufacturing process, in particular during the extrusion laminating process.

In a further preferred embodiment, the outer protective layer and/or the inner protective layer, in particular the outer protective layer and/or inner protective layer comprising the at least one bicomponent fiber, and/or the functional layer has an adhesion-promoting layer. The adhesion-promoting layer can in particular be arranged on the outside of the outer protective layer, the inner protective layer and/or the functional layer.

In particular, the adhesion-promoting layer can be designed as an adhesive layer and/or the adhesion promoter as an adhesive. Preferably, the adhesion-promoting layer and/or the adhesive layer enables a material bond between the layers to be joined.

Preferably, an adhesive layer is provided between the membrane layer and the outer and/or the inner protective layer, in particular over the entire surface, preferably for firm as well as material bonding.

The adhesion-promoting layer may further comprise a polymer, in particular an adhesion promoter polymer. The adhesion-promoting layer may be firmly bonded to the functional layer, the inner protective layer and/or the outer protective layer. Furthermore, the adhesion-promoting layer and/or the adhesion promoter polymer may comprise a plastic and/or a synthetic resin, preferably polyurethane.

Furthermore, the adhesion-promoting layer can also be integrated in the inner protective layer, in the outer protective layer and/or in the functional layer—in such a way that the adhesion promoter polymer is enclosed and/or arranged in the, in particular outer, surface region of the aforementioned layers. Thus, the adhesion-promoting layer can be formed as part or component of the functional layer and/or the outer protective layer and/or the inner protective layer. The adhesion-promoting layer can enable a firm connection of the functional layer to the outer protective layers. The adhesion promoter and/or adhesion promoter polymer enables the protective layers, which are formed as nonwoven layers, to be permanently bonded to the functional layer.

By incorporating functional materials, for example the adhesion promoter polymer and/or a flame retardant, into the inner and/or outer protective layer formed as a nonwoven layer, a cost-effective structure of the composite film can be made possible.

By using the adhesion promoter and/or the adhesion promoter polymer and/or the adhesion-promoting layer in the outer layer of the inner and/or outer protective layer, in particular in the inner and/or outer protective layer comprising the bicomponent fiber, the use of hotmelts can be dispensed with (hotmelt-free bonding). Thus, the adhesion promoter and/or the adhesive can already ensure sufficient bonding and/or adhesion to the functional layer.

In addition, the sub-roofing sheet can be designed to be open to diffusion, windproof and/or rainproof, in particular waterproof, and/or water-repellent and/or permeable to water vapor. The rainproofness and/or water vapor permeability can be ensured in particular by the diffusion-open functional layer, the functional layer being designed in such a way that the composite sheet is designed to be water vapor permeable and/or diffusion-open and/or waterproof, in particular water vapor permeable and waterproof, as a whole.

In the case of a rainproof and/or waterproof design of the composite film, it is provided that it withstands a water column of greater than 800 mm, preferably between 1,000 mm and 20,000 mm, more preferably between 1,500 mm and 9,000 mm. The water column is a unit of measurement that indicates the waterproofness of technical fabrics. It can be determined according to DIN EN 20811:1992, also known as ISO 811 (as of September 2018).

Preferably, the composite film has an Sd value of less than or equal to 0.5 m, preferably from 0.008 m to 0.5 m, more preferably from 0.009 m to 0.2 m, more preferably from 0.01 m to 0.1 m. The Sd value indicates the water vapor diffusion equivalent air layer thickness and is a building physics measure of the water vapor diffusion resistance of a component or component layer. The vapor permeability of a building material can be assessed via the Sd value. The water vapor diffusion resistance is graphically described by the thickness of a layer of air that is necessary so that the same diffusion current—as the component under consideration—flows through the air layer in a stationary state under the same conditions. In particular, the composite film is designed to be open to diffusion, wherein the openness to diffusion is characterized by an Sd value of less than or equal to 0.5 m.

In addition, the tear strength of the composite film can be designed to be greater than 50 N/mm. Preferably, the tear strength of the composite film is between 50 N/mm to 600 N/mm, more preferably between 100 N/mm to 400 N/mm. The tear strength of the composite film may correspond to the force required until crack formation and/or crack expansion. In particular, the tear strength is measured according to the ASTM International technical standard; namely ASTM D1004 (as of September 2018) and ASTM D1925 (as of September 2018).

Preferably, the tear strength of the composite film is greater than 50 N/mm. Preferably, the tear strength is between 50 N/mm and 500 N/mm, more preferably between 100 N/mm and 300 N/mm. The tear propagation strength is a physical parameter that characterizes a material property as well as the application range of the composite film. The tear propagation strength can also be referred to as notch strength. The tear propagation strength indicates the resistance of a material—in this case the composite film—not to tear further after being cut or scored. The higher the determined value of the tear resistance, the more resistant the tested material is to further tearing. In contrast, the lower the value, the lower the tear resistance of the material. Consequently, the tear propagation strength follows metrologically the measurement of the tear strength.

Both the tear strength and the tear propagation strength can be designed to be direction-dependent, in particular as a function of the fiber direction (machine direction and transverse direction). The above-mentioned tear strengths apply in particular to the machine direction and/or transverse direction.

The machine direction is the direction in which the nonwoven was transported in and/or through the machine during production, i.e. regularly the length direction of a nonwoven web. The transverse direction in which the web expands over its surface is the direction at right angles to the machine direction, i.e. regularly the direction in the width of a web.

Furthermore, according to a further embodiment, it is provided that at least one reinforcing layer is arranged between the functional layer and the outer protective layer and/or the inner protective layer. In particular, a reinforcing layer can be arranged in each case between the outer protective layer and the functional layer and between the inner protective layer and the functional layer. The reinforcing layer may be formed as a leno fabric. The reinforcing layer serves in particular to increase the mechanical stability of the composite film.

Preferably, the reinforcing layer comprises and/or consists of a plastic and/or a synthetic resin, preferably a plastic polymer, in particular polypropylene and/or polyethylene terephthalate (PET).

Leno fabrics are transparent and/or air-permeable fabrics characterized by special warp threads. The warp threads form the so-called leno units, in which a ground thread and a loop thread from the warp twist together. In this process, the inclusion of the weft and the twisting of the two warp threads alternate with each other. In the case of a so-called full twist, a complete twist of the warp threads is caused between the weft threads; in the case of a half twist, a simple interlacing occurs. In particular, the fabric has a low grammage. By tightly enclosing the weft threads from the two warp threads, a sliding strength can be ensured.

In a further preferred embodiment, at least one longitudinal edge-side adhesive zone is provided on the topside and/or the underside of the composite film, in particular on the topside and/or the underside of the outer and/or the inner protective layer. The longitudinal edge-side adhesive zone is used for bonding adjacent composite films to produce a continuous film layer consisting of individual composite film strips. In particular, the longitudinal edge-side adhesive zone is spaced from the longitudinal edge of the composite film. Furthermore, the adhesive zone can be in the form of strips, possibly as interrupted strips.

In particular, the adhesive zone has a width of between 2 to 10 cm.

Further preferably, an adhesive-free area on the surface of the topside and/or the underside of the composite film of greater than 50%, preferably between 50% to 95%, more preferably between 80% to 90%, is provided. An adhesive-free or adhesive-free area indicates that portion of the surface of the composite film which is not covered by an adhesive zone. Ultimately, therefore, the adhesive zone is provided along the longitudinal edge on the topside and/or underside.

It is understood that the composite film may have one adhesive zone, two adhesive zones and/or a plurality of adhesive zones, for example four adhesive zones. It may be provided that at least one longitudinal edge-side adhesive zone is provided on the topside and/or the underside.

Thus, at least one—in particular exactly one—adhesive zone can be provided on both the topside and the underside. Furthermore, two edge-side adhesive zones can also be provided on the top or underside. In a further embodiment, one adhesive zone is provided in the region of each of the four longitudinal edges of the composite sheet, so that the composite sheet has four adhesive zones.

Preferably, the adhesive zones are between 1 to 90 mm from the longitudinal edge, preferably between 3 to 70 mm, more preferably between 5 to 50 mm.

In addition, a strip-shaped design of the adhesive zones can enable a clean and simple arrangement of the sheets one above the other, in particular in the case of an adhesive-in-adhesive bond. In the case of a strip-shaped formation of the adhesive zones, it is provided that in particular the number of strips is between 1 to 15, preferably between 3 to 12, more preferably between 5 to 9. The strip width of a strip of the adhesive zone can in particular be between 1 to 30 mm, preferably between 1.5 to 10 mm, more preferably between 2 to 5 mm.

Preferably, the bonding of the adhesive zones is carried out in such a way that, when an adjacent composite film is bonded, a windproof and/or airtight bond is formed between the two composite films. In particular, as a result, no wind can penetrate between the bonded areas. In particular, an adhesive-in-adhesive bond is effected, that is to say the adhesive zones are arranged one above the other, at least in certain areas, in such a way that a firm and permanent bonding of the rows of composite films is effected. In this context, it is understood that the adhesive zones can be of the same design and/or can have properties that differ from one another.

In addition, the offset of the top and underside adhesive zones from a longitudinal edge of the composite sheet may be provided such that when adjacent sheets are bonded, there is only a partial adhesive-in-adhesive bond between the adhesive zones of adjacent composite sheets or even no such bond. As previously explained, the adhesive-in-adhesive bond enables windproof, airtight, diffusion-open and/or waterproof bonding of the composite film. Thus, the required properties of the composite film can also be adequately ensured at the transition areas of the composite film, in particular the longitudinal edge area, preferably when installed on a pitched roof.

In a further preferred embodiment of the invention, it is provided that the mating surface for the adhesive zone comprising the adhesive is covered and/or surface-treated with a liner, in particular in the form of a peel-off strip. By covering the adhesive and/or the adhesive zones, it can be ensured that there is no contamination of the adhesive zone when the composite film is laid, and/or that the degree of contamination is kept as low as possible. Consequently, a windproof and/or watertight bond can be produced, preferably via an adhesive-in-adhesive bond.

According to the invention, it is provided that the inner protective layer and/or the outer protective layer comprises at least one bicomponent fiber and/or has a bicomponent fiber structure. In particular, the inner and/or outer protective layer formed as a nonwoven layer is formed as a nonwoven layer of bicomponent fibers. In particular, a bicomponent fiber spunbond layer is provided.

Bicomponent fibers of the type in question usually have a first component made of a first polymer and a second component made of a second polymer. A distinction can be made between different types of bicomponent fibers, each having different characteristic distributions of the components in the fiber cross-section. Bicomponent fibers in which the first component surrounds and thus encloses the second component in the cross-section of the fiber are referred to as core-sheath fibers. Bicomponent fibers in which both the first component and the second component form part of the fiber surface in the cross-section of the fiber are referred to as side-by-side fibers. Fibers with structures in which multiple strands of one component are embedded in a strand of the other component, resulting in an image resembling a plurality of islands formed from one component in cross-section, are referred to as island-in-the-sea fibers. Bicomponent fibers in which a plurality of regions of each component are present in cross-section and form the outer fiber surface are referred to as segmented-pie fibers, since the regions of the individual components regularly have a pie-piece-like division in cross-section. Bicomponent fibers within the meaning of the present application are also expressly understood to be those fibers which have more than two components.

The purpose of bicomponent fibers is to improve the properties of the fibers or the properties of the spunbonded nonwovens produced from the fibers. The properties of a spunbonded nonwoven depend on a large number of influencing factors. Some of these factors influencing the properties of a spunbonded nonwoven are properties of the fibers used, such as their strength. A widely accepted theory, at least in its basic concept, is that the properties of the resulting bicomponent fiber then represent a combination of the properties of the individual components of the bicomponent fiber, in which the properties of the individual components complement each other as far as possible so that the advantages of the properties of both components are combined in the bicomponent fiber. If, for example, a fiber is desired that both exhibits high strength and also exhibits advantageous behavior when the fibers are bonded to one another during nonwoven production, it is a good idea to combine a first component that exhibits high strength with a second component that exhibits good bondability.

Additives are often added to the polymers to improve the properties of the bicomponent fibers. The additives can be a wide variety of substances. They can be used, for example, for coloring, thermostabilization, flame retardancy, hydrophilization or hydrophobization, or UV stabilization. The additives are regularly distributed evenly in the phase.

The first polymer and the second polymer may be formed at least substantially identically, in particular wherein the first component and the second component have additives and/or additive compositions and/or additive amounts that differ from one another.

Preferably, the first component has an additive, the mass fraction of the additive in the second component being smaller than in the first component. According to the invention, the first component can thus have an additive for influencing and/or improving properties.

Preferably, the mass fraction of the additive of the first component in the second component is at most 66.6%, further preferably at most 50% and in particular at most 33.3%. Very preferably, the additive is not present in the second component.

Preferably, the mass fraction of the first component in the bicomponent fiber is at most 50%, preferably 25%, particularly preferably 10%, very particularly preferably 5%. The bicomponent fiber is particularly preferably a core-sheath fiber, with the first component forming the sheath.

The advantage of concentrating the additives in the first component surrounding the second component is that it has been shown that the amount of additive required in the second component can be lower than with the usual equal distribution of the additive in the two components, if the same or an improved effect of the additive is to be produced.

Additive in this sense means additives which are added to the polymer in the respective component in order to modify and thereby improve the properties of the resulting fiber or the spunbonded web obtained from the fiber.

For example, when performing a fire test according to EN 13501-1, it can be seen that with the distribution of the additive in the components according to the invention, a smaller amount of the additive in total, in this example a flame retardant, is sufficient to lead to a positive test result than if the flame retardant is evenly distributed in the fiber. In this test, the entire fiber is covered by the flame within fractions of a second, so the beneficial effect cannot be readily attributed to some sort of shielding effect of the sheathing area of the fiber.

The additives, which are added to the polymers in low concentrations, basically represent an impurity of the polymer with regard to fiber production. In the case of impurities, there is basically always the risk that the behavior of the components will change during the manufacture of the fiber due to these impurities. Therefore, from the point of view of the skilled person, an uneven distribution of the additives in the components of the bicomponent fiber initially involves the risk that the quality of the bicomponent fiber or the stability of the manufacturing process will deteriorate. Moreover, from the point of view of the skilled person, it is regularly not important that an additive is concentrated in a particular zone of the fiber. This is due to the low thickness of the fibers in question. Similar to the situation with dyes or pigments, it also makes no obvious sense from the point of view of the skilled person to concentrate additives in a specific zone of the fiber. For example, in the case of a flame retardant, the entire fiber will be affected by the combustion processes anyway. Also, UV radiation will penetrate the entire fiber. Nevertheless, it has been shown surprisingly that in some cases even particularly advantageous results can be obtained if the additive in the one component is not only reduced but omitted altogether. In any case, one advantage of concentrating the additives in the first component is the cost saving due to the lower additive quantity required.

Advantageously, the additive is a primary or secondary antioxidant, a UV absorber, a UV stabilizer, a flame retardant, an antistatic agent, a lubricant, a metal deactivator, a hydrophilizing agent, a hydrophobizing agent, an antifogging additive and/or a biocide. The following classes of substances and mixtures thereof are particularly preferred:

Sterically hindered phenols, aromatic secondary or tertiary amines, aminophenols, aromatic nitro or nitroso compounds as primary antioxidants.

Organic phosphites or phosphonates, thioethers, thioalcohols, thioesters, sulfides and sulfur-containing organic acids, dithiocarbamates, thiodipropionates, aminopyrazoles, metal-containing chelates, mercaptobenzimidazoles as secondary antioxidants.

Hydroxybenzophenones, cinnamates, oxalanilides, salicylates, 1,3 benzenediol monobenzoates, benzotriazoles, triazines, benzophenones and UV-absorbing pigments such as titanium dioxide or carbon black as UV absorbers.

Metal-containing complexes of organic sulfur or phosphorus compounds, sterically hindered amines (HALS) as UV stabilizers.

Metal hydroxides, borates, organic compounds containing bromine or chlorine, organic phosphorus compounds, antimony trioxide, melamine, melamine cyanurate, exfoliated graphite or other intumescent systems as flame retardants.

Quaternary ammonium salts, alkyl sulfonates, alkyl sulfates, alkyl phosphates, dithiocarbamates, (earth) alkali metal carboxylates, polyethylene glycols and their esters and ethers, fatty acid esters, ethoxylates, mono- and diglycerides, ethanolamines as antistatic agents.

Fatty alcohols, esters of fatty alcohols, fatty acids, fatty acid esters, dicarboxylic acid esters, fatty acid amides, metal salts of fatty acids, polyolefin waxes, natural or artificial kerosenes and their derivatives, fluoropolymers and fluoroligomers, antiblocking agents such as silicas, silicones, silicates, calcium carbonate, etc. as lubricants.

Amides of mono- and dicarboxylic acids and their derivatives, cyclic amides, hydrazones and bishydrazones, hydrazides, hydrazines, melamine and its derivatives, benzotriazoles, aminotriazoles, sterically hindered phenols in combination with complexing metal compounds, benzylphosphonates, pyridithiols, thiobisphenol esters as metal deactivators.

Polyglycols, ethoxylates, fluoropolymers and fluoroligomers, montan waxes, especially stearates, as hydrophilizing, hydrophobizing or anti-fogging agents.

10,10'-oxybisphenoxarsine (OBPA), N-(trihalomethylthiol)phthalimide, tributyltin oxide, zinc dimethyldithiocarbamate, diphenylantimony-2-ethylhexanoate, copper-8-hydroxyquinoline, isothiazolones, silver and silver salts as biocides.

Advantageously, the difference between the melting points of the first component and the second component is less than or equal to 8° C. It should be noted that any individual intervals or individual values are included in the specified intervals and are to be regarded as disclosed as essential to the invention, even if they are not mentioned in detail.

In connection with the advantageous choice of melting points, it has been surprisingly shown that in the case of bicomponent fibers, where the two components have similar melting points, an improvement in the synergistic effects between the properties of the two components can be achieved. This relates in particular to mechanical properties. For example, in the case of a spunbonded nonwoven made from bicomponent fibers according to the invention, it is possible to increase both the specific tear strength and the specific nail pull-out force. In the case of conventional prior art fibers, measures taken in the manufacture of spunbonded nonwovens from these fibers to increase the specific tensile strength were regularly accompanied by a reduction in the specific nail pull-out force. Conversely, measures to increase the specific nail pull-out forces regularly led to a decrease in the specific tear-out forces. These disadvantageous effects can be avoided or at least mitigated with the advantageous bicomponent fibers.

Among the positive effects of the present invention is that the amount of recycled material that can be added to one of the components in the manufacture of the bicomponent fiber is increased compared to conventional fibers. It has been shown that when components with melting points combined according to the invention are used, the change in the properties of a component caused by the addition of recycled material is much less than with conventional fibers.

Preferably, the component with the lower melting point forms the outer surface of the fiber in the cross-section of the fiber. Preferably, the component with the lower melting point surrounds the component with the higher melting point. This advantageous embodiment results in the lower melting point component in the cladding region of the fiber providing better solidifiability of the material, and also improves the spinning stability as well as the extensibility of the fibers. This leads to an improvement in the softness and/or feel of the spunbonded web, and furthermore the drapability of the fibers or of a spunbonded web obtained from the fibers is improved.

In the context of the invention, it is advantageous if the difference in the melting points of the first component and the second component is at most 6° C. or between 1° C. to 8° C., preferably between 1° C. to 6° C. In these advantageous parameter ranges, the positive effects of the present invention occur significantly more strongly.

Preferably, the mass fraction of the component with the lower melting point in the bicomponent fiber is at most 50%, further preferably at most 25%, preferably at most 10%, in particular at most 5%. In this context, the bicomponent fiber is particularly preferably a core-sheath fiber, with the component with the lower melting point forming the sheath.

Advantageously, the difference between the melt flow indices of the first component and the second component is less than or equal to 25 g/10 min, with the melt flow indices (hereinafter MFIs) of the first component and the second component each being less than or equal to 50 g/10 min. Preferably, the difference between the melt flow indices of the first component and the second component is less than or equal to 20 g/10 min, particularly preferably 15 g/10 min, and/or the MFIs of the first component and the second component are each less than or equal to 40 g/10 min. Such advantageous selection of the components according to the criterion of their MFIs has, surprisingly, a positive effect in a manner similar to the selection of the components according to the invention on the basis of their melting points.

The MFI is measured according to ISO 1133 with a test load of 2.16 kg and a test temperature of 230° C. The MFI is also referred to as the melt flow index or MFR. The MFI is also referred to as the melt flow index or melt flow rate (MFR). It is determined according to ISO 1133 by melting the material in a heatable cylinder and forcing it through a defined die by means of the test load. The MFI is a measure of the viscosity of the melt of the respective polymer-containing component. The viscosity, in turn, is related to the degree of polymerization, which corresponds to the average number of monomer units in each molecule of a polymer.

The positive influence of the advantageous differences of the MFIs mainly concerns the specific tensile strength and the specific nail pull-out force. These two characteristic values of a spunbonded nonwoven made from the fibers can be improved by the advantageously selected MFIs. It is even possible to increase both characteristic values simultaneously, but in any case one of the two characteristic values can be improved without the other characteristic value deteriorating. This also has a positive effect on the haptic properties. Thus, the specific tensile strength can be increased without negatively affecting softness and the so-called "textile handle". The term "textile handle" is understood to mean a feeling of touch that is perceived as pleasant.

Preferably, the mass fraction of the component with the higher MFI in the bicomponent fiber is at most 50%, further preferably at most 25%, preferably at most 10%, in particular at most 5%. In this context, the bicomponent fiber is particularly preferably a core-sheath fiber, with the component with the higher MFI forming the sheath.

Advantageously, the polymer of one of the two components has been polymerized with a metallocene catalyst and the polymer of the other component has been polymerized with a Ziegler-Natta catalyst and subjected to a subsequent visbreaking treatment Preferably, the polymer is a polyolefin, in particular polypropylene, polyethylene or their copolymer or a mixture thereof. The other polymer is preferably also polyolefin or a polyolefin copolymer. It is particularly advantageous if both polymers are composed of the same monomer or are at least predominantly composed of the same monomer.

Metallocene catalysts are structurally uniform catalysts containing transition metals coordinated by cyclopentadiene ligands. Such catalysts are described in detail in U.S. Pat.

Nos. 5,374,696 and 5,064,802. Express reference is made to the related disclosure. The advantage of these catalysts is that the polymers prepared with these catalysts have a narrow molecular weight distribution. The narrow molecular weight distribution results in nonwovens with high elongation at break. Here, the elongation at break is the elongation of the fibers that results at the maximum of the breaking force applied when a nonwoven strip is torn. Most importantly, a narrow molecular weight distribution leads to an increase in process reliability during the production of spunbonded nonwovens. The frequency of spinning disturbances, such as fiber breakage, is reduced. Furthermore, a higher draw of the fibers is possible, higher spinning speeds can be achieved and the titers that can be achieved are lower. Here, lower titers mean a higher fineness of the fibers and/or the yarns obtained from the fibers.

Another advantage of metallocene catalysts and/or polymers produced using metallocene catalysts is that the residual content of the catalyst in the polymer is very low. The residual content of the catalyst in the polymer represents an impurity of the polymer and can cause the properties of the polymer to be changed in an undesirable way. For example, discoloration may occur during processing of the polymer.

A disadvantage of the metallocene catalysts is their slightly higher price compared to the Ziegler-Natta catalysts. Furthermore, thermal bonding of the fibers during nonwoven production can be impeded when metallocene catalysts are used. This can be the case if the possibilities opened up by the use of metallocene catalysts to increase the crystallinity and strength of the individual fibers through their higher stretchability are exploited to a high degree.

Ziegler-Natta catalysts are heterogeneous mixed catalysts containing organometallic compounds of main group elements and transition metal compounds. In particular, elements of the first to third main groups are used as main group elements. The transition metal compounds contain, in particular, metals of the titanium group. A large number of variants of these catalysts exist. For the purposes of the present invention, the Ziegler-Natta catalysts are defined essentially by their distinction from the metallocene catalysts.

Although the Ziegler-Natta catalysts are less expensive than the metallocene catalysts, the poylmers produced with the Ziegler-Natta catalysts have a significantly broader molecular weight distribution than polymers produced with metallocene catalysts. To improve the stretchability of the fibers, which serves in particular to increase process reliability, the polymers produced with Ziegler-Natta catalysts are therefore usually posttreated. This post-treatment is referred to as "visbreaking". During the visbreaking treatment, polymer chains are cleaved, reducing the molecular weight of the individual molecules and increasing the number of molecules. This also reduces the width of the molecular weight distribution. The cleavage of polymer chains is brought about by heat, irradiation, the addition of peroxide or similar measures. Examples of such visbreaking treatments are described in U.S. Pat. Nos. 4,282,076 and 5,723,217, among others.

However, such visbreaking treatment cannot achieve the narrow molecular weight distribution of polymers produced with metallocene catalysts, nor the good stretchability of fibers obtained from these polymers. Also, polymers produced with Ziegler-Natta catalysts have a higher content of impurities than polymers produced with metallocene catalysts. This is due, on the one hand, to the fact that a comparatively higher catalyst content is required when producing the polymer with a Ziegler-Natta catalyst, which necessitates a comparatively higher proportion of catalyst residues in the polymer, and, on the other hand, to auxiliaries that are added as part of the visbreaking treatment, as a result of which they represent an additional source of impurities in the finished polymer.

The advantage of polymers produced using Ziegler-Natta catalysts with subsequent visbreaking treatment is mainly their low price and high availability on the market. Another advantage is the good thermal bondability of the fibers produced from these polymers.

Surprisingly, it has now been shown that the advantageous selection of polymers on the basis of the catalysts used in their production means that the resulting bicomponent fibers allow a combination of the advantages of using the respective catalyst types. Thus, it is possible to reduce the costs compared to the use of pure polymer fibers produced by means of metallocene catalysts, while at the same time realizing the advantages of using metallocene catalysts. In addition, better bondability of the fibers can be achieved compared to fibers made from polymers produced exclusively using metallocene catalysts.

Preferably, the mass fraction of the component whose polymer has been polymerized with a metallocene catalyst in the bicomponent fiber is at most 50%, further preferably at most 25%, preferably at most 10%, in particular at most 5%. The bicomponent fiber is particularly preferably a core-sheath fiber, with the component whose polymer has been polymerized with a metallocene catalyst forming the sheath.

Advantageously, the first polymer and/or the second polymer is a polyolefin or a polyolefin copolymer, preferably a polymer and/or copolymer of ethylene, propylene, butylene, hexene or octene and/or a mixture and/or a blend thereof. It has been shown that these polymers are particularly well suited for producing the bicomponent fibers according to the invention therefrom. In this context, a copolymer is to be understood as a polymer prepared from at least two different types of monomers, the mass fraction of the monomer which is decisive for the designation of the copolymer being at least 50%.

Preferably, the first polymer and/or the second polymer may be polyethylene terephthalate (PET) and/or a polyethylene terephthalate copolymer, in particular, the first polymer and/or the second polymer consists of PET and/or Co-PET.

Particularly preferred for the bicomponent fiber is a material composition for the first and second components of polypropylene and/or polyethylene and polyethylene terephthalate and/or polyethylene terephthalate copolymer. Here, either the first or the second polymer may comprise and/or consist of polyproplyene and/or polyethylene. Depending on whether the first or second polymer comprises PP and/or PE, the second or first polymer not comprising PP and/or PE comprises and/or consists of PET and/or Co-PET. Consequently, if the first polymer comprises PP and/or PET, the second polymer comprises PET and/or Co-PET and vice versa.

Preferably, the bicomponent fiber is a core-sheath fiber, wherein the mass fraction of the core is 50% to 98%, preferably 60% to 95%, more preferably 70% to 95%, most preferably 80% to 90%. It has been shown that the advantages of the bicomponent fiber according to the invention, when it is a core-sheath fiber, occur to a particular extent with these advantageous mass fractions of the core.

If the bicomponent fiber is a side-by-side fiber, segmented-pie fiber or islands-in-the-sea fiber, the mass ratio of the two components is in the range from 10:90 up to 90:10, preferably in the range from 70:30 up to 30:70, particularly preferably in the range from 60:40 up to 40:60. For these fiber types, it has been shown that the advantages of the bicomponent fiber according to the invention can be achieved particularly well for the listed component ratios.

In another preferred embodiment, the bicomponent fiber is a multilobal, in particular a tetralobal or trilobal fiber. Due to their cross-sectional geometry, these fibers offer a higher specific surface area than comparable fibers with circular cross-sections. In combination with these, the advantages of the fibers according to the invention can be exploited particularly efficiently, especially when the different properties of the components to be optimized by the bicomponent fiber according to the invention are properties that affect the surface of the fiber.

Advantageously, the diameter of the bicomponent fiber is between 1 μm and 50 μm, preferably between 5 μm and 30 μm, particularly preferably between 8 μm and 20 μm. It has been shown that especially with fiber diameters in these advantageous ranges, the combination of two components in a bicomponent fiber leads to synergy effects to a particular extent.

In particular, the outer protective layer and/or the inner protective layer is formed as a spunbonded fabric with bicomponent fibers according to the invention. The spunbonded fabric can have the advantages and/or properties described below.

By using the bicomponent structure of the inner and/or outer protective layer formed as a nonwoven layer, a higher strength, in particular a strength improved by up to 20%, can be achieved compared to a polypropylene spunbond. Furthermore, very good weathering stability properties, in particular improved UV and hydrolysis properties, can be provided.

Two properties that play a special role in spunbonded nonwovens are the specific tensile strength of the spunbonded nonwoven and the specific nail pull-out force of the spunbonded nonwoven. A desirable high specific tensile strength is achieved by fibers with high strength.

Good bondability in this sense means that the mobility of the fibers in the spunbonded web can be adjusted as defined as possible during the bonding of the fibers during the production of a spunbonded web. The specific adjustment of the mobility of the fibers in the nonwoven, which depends on the strength of the bond between the fibers, is the prerequisite for producing a spunbonded nonwoven with high specific tensile strength and simultaneously high specific nail pull-out force.

In practice, there may be the problem that suitable fibers with high strength have poor bondability and fibers with good bondability only have low strength. Therefore, especially in the case of the production of a spunbonded nonwoven, which is to have both a high specific tensile strength and a high specific nail pull-out strength, the use of a bicomponent fiber is useful. The bicomponent fibers of the invention are particularly suitable for achieving a high specific tensile strength and a high specific nail pull-out force of a spunbonded nonwoven, since the bicomponent fibers of the invention can be optimized with respect to a combination of good bonding properties and high strength.

Such a nonwoven fabric made from the fibers of the invention is suitable for numerous applications, for example in medicine, in the hygiene sector, in the automotive industry, in the clothing sector, in home and technical textiles, and in particular in the construction sector and agriculture. According to the invention, the field of application of the nonwoven overlaps with the field of application of the composite film. Possible applications further include use in filters and membranes, battery separators, and as a support nonwoven for laminates and as a carrier for coatings of all kinds.

Advantageously, the specific breaking force of the spunbonded web is at least 1.8 N/g·5 cm in machine direction and/or at least 1.3 N/g·5 cm in transverse direction, preferably 2.0 N/g·5 cm in machine direction and/or at least 1.5 N/g·5 cm in transverse direction, preferably at least 2.2 N/g·5 cm in machine direction and/or at least 2.0 N/g·5 cm in transverse direction, particularly preferably at least 2.4 N/g·5 cm in machine direction and/or at least 1.9 N/g·5 cm in transverse direction. The specific tensile strength is measured according to EN 12311-1.

It has been shown that these advantageous minimum values for the specific tear strength of the spunbonded web should be aimed for in any case if bicomponent fibers according to the invention are used for the production of the spunbonded web. The bicomponent fibers according to the invention make it possible to achieve these advantageous minimum values for the specific tensile strength without a disproportionate drop in the specific nail pull-out force.

Advantageously, the specific nail pull-out force of the spunbonded web is at least 1.0 N/g in machine direction and/or at least 1.2 N/g in transverse direction, preferably at least 1.4 N/g in machine direction and/or at least 1.5 N/g in transverse direction, preferably at least 1.6 N/g in machine direction and/or at least 1.8 N/g in transverse direction, particularly preferably at least 1.8 N/g in machine direction and/or at least 2.1 N/g in transverse direction.

The specific nail pull-out force is the maximum force that occurs during the tearing of a nonwoven strip when the nonwoven strip already has a given damage, namely a nail pierced through the nonwoven fabric. The specific nail pull-out force is measured according to EN 12310-1. It has been shown that the minimum values mentioned for the specific nail pull-out force of the spunbonded nonwoven can be aimed at without the specific tear-out force of the spunbonded nonwoven dropping disproportionately if bicomponent fibers according to the invention are optimized accordingly with respect to their bondability and strength. In particular, it is also possible to realize a combination of the above-mentioned specific advantageous nail tear-out forces and the above-mentioned advantageous specific minimum tear-out forces.

The combination of these two advantageous minimum parameters results in a spunbonded web that is suitable for a wide range of applications in terms of its mechanical properties. Such a spunbonded web can, for example, be used well in the construction sector, where it must often be possible to fasten the spunbonded webs by nailing, stapling or screwing. The spunbonded web must not tear off or tear out when it is fastened to a roof, for example. It is also quite possible to use these advantageous spunbonded webs as geotextiles. In any case, geotextiles must have a high tolerance for punctual damage, such as that caused by sharp stones.

In practice, high specific nail pull-out strength often goes hand in hand with good haptics. The softness and textile feel of such spunbonded nonwovens and the composite films therefore also open up applications, e.g. applications in the hygiene or medical sectors. The reason for the good feel is the high mobility of individual fibers, which is regularly accompanied by the occurrence of high nail pull-out forces. In practice, fibers that behave in this way also regularly exhibit haptic properties that are perceived as soft and pleasant. Fiber segment mobility allows fibers to "collect" in the nail as the nail moves through the nonwoven by avoiding the nail moving through the nonwoven and not tearing immediately. This results in a zone of increased fiber density, i.e. a zone of increased strength, around the nail.

Furthermore, the present invention relates to the use of a composite film according to one of the embodiments described above as a construction film, facade membrane, building envelope and/or roofing membrane and/or for use in the construction industry.

In order to avoid unnecessary repetition, reference is made to the previous embodiments, advantages and/or preferred embodiments, which apply in the same way to the use according to the invention.

Furthermore, it is understood that any intermediate intervals and individual values are included in the aforementioned intervals and range limits and are to be considered disclosed as essential to the invention, even if these intermediate intervals and individual values are not specifically indicated.

Further features, advantages and possible applications of the present invention will be apparent from the following description of examples of embodiments based on the drawing and the drawing itself. In this context, all the features described and/or illustrated constitute, individually or in any combination, the subject-matter of the present invention, irrespective of their summary in the claims and their relation back.

Figure 2:
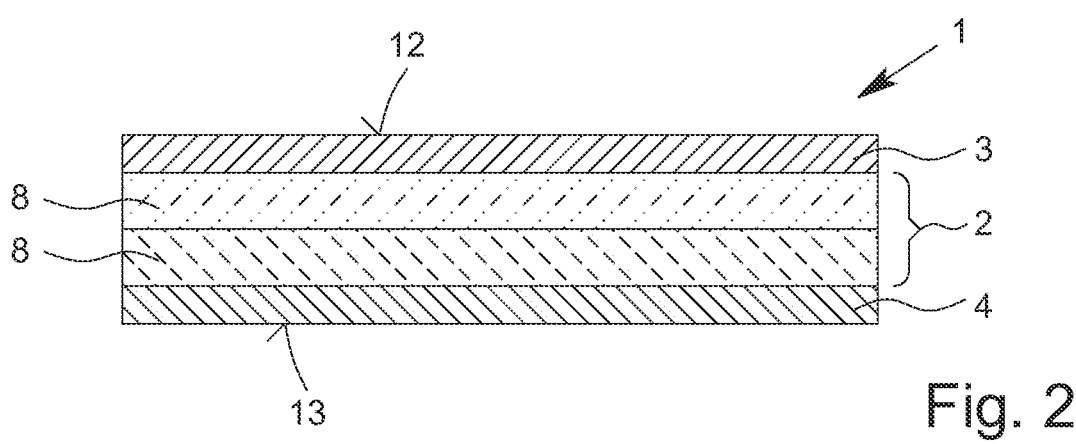
Figure 3:
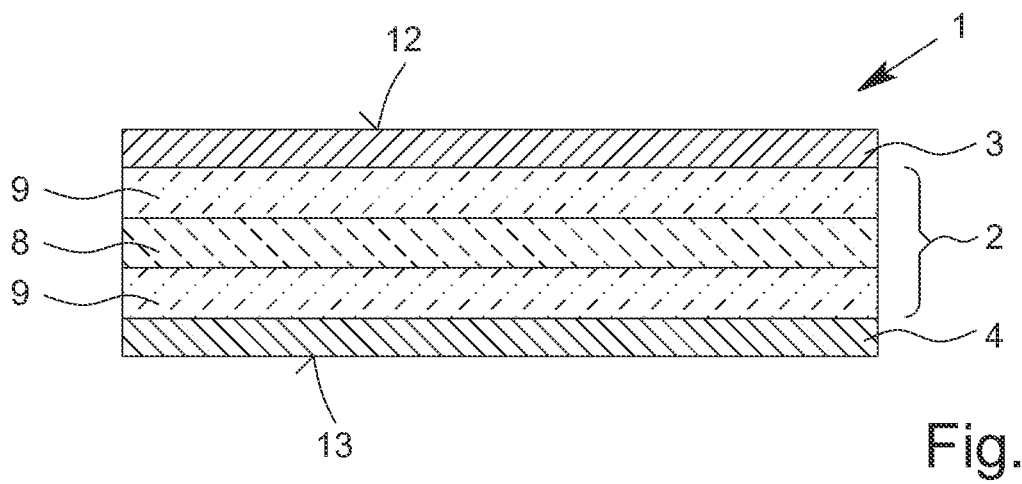
Figure 4:
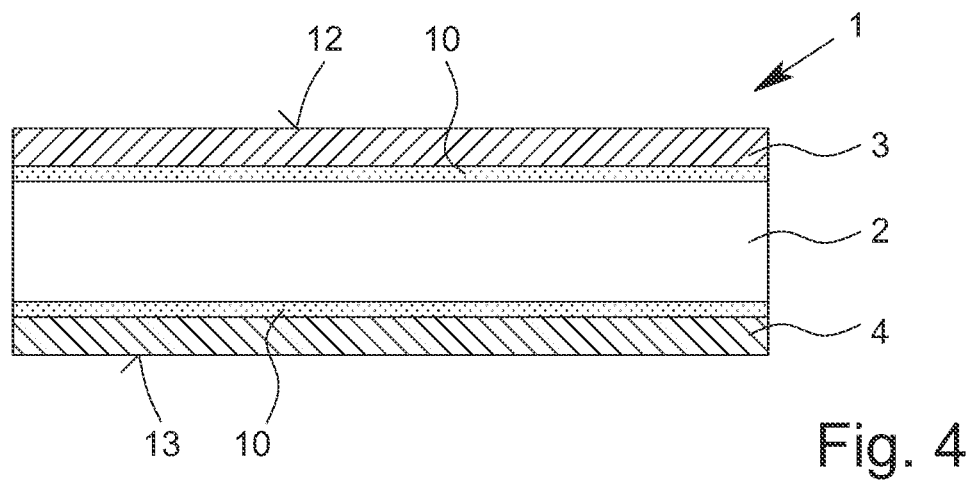
Figure 5:
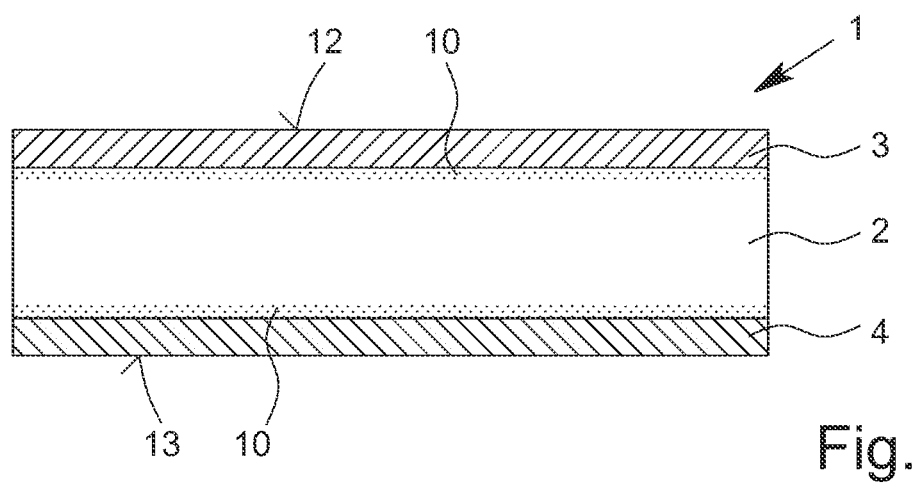
Figure 6:
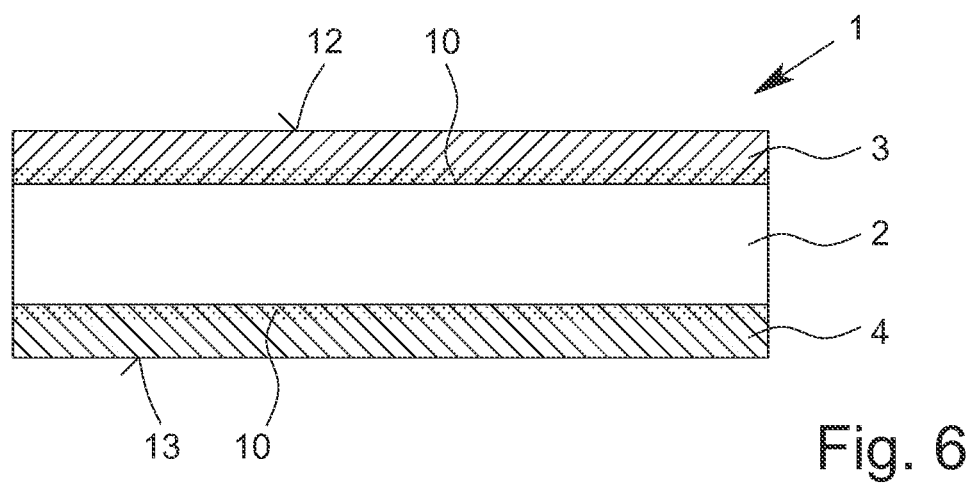
Figure 7:
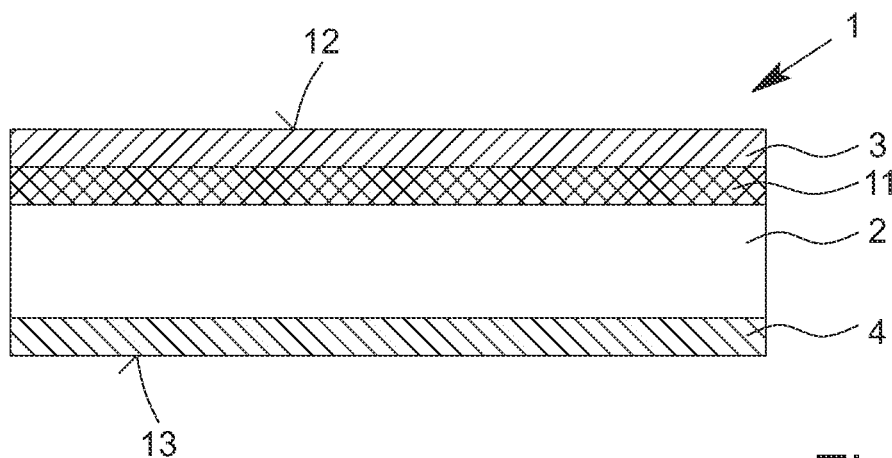
Figure 8:
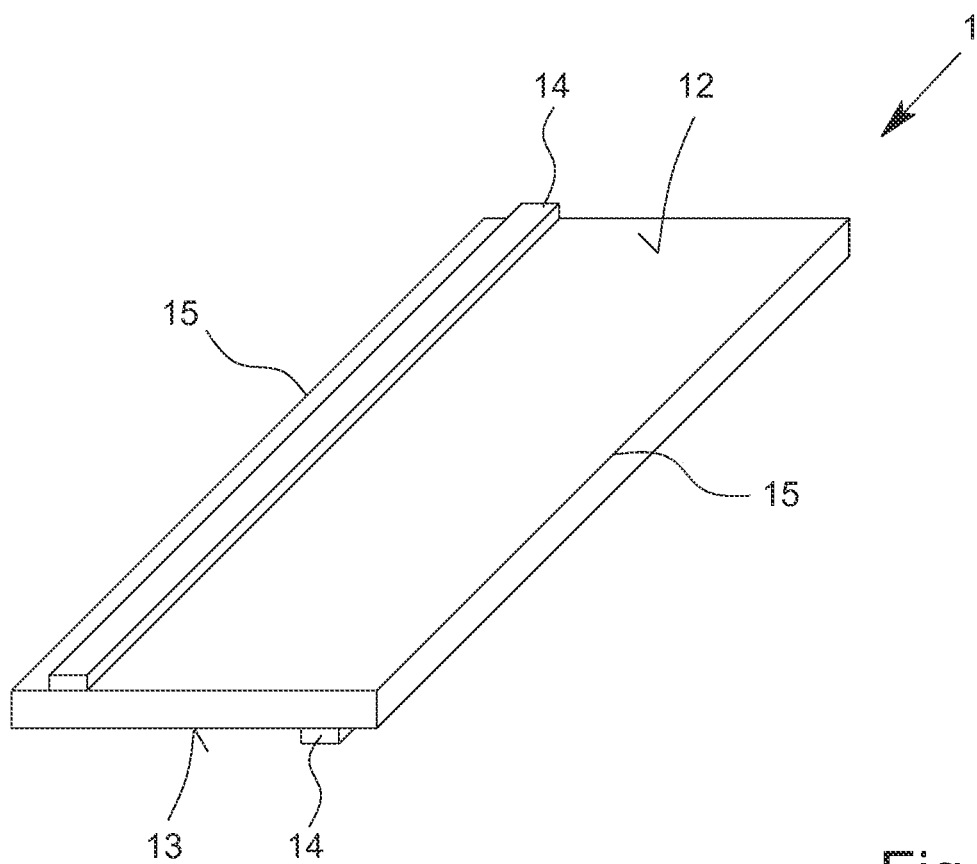
Figure 9:
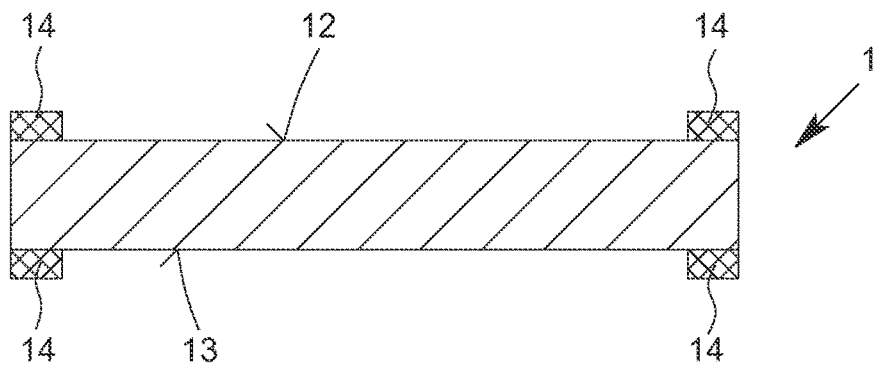
Figure 10:
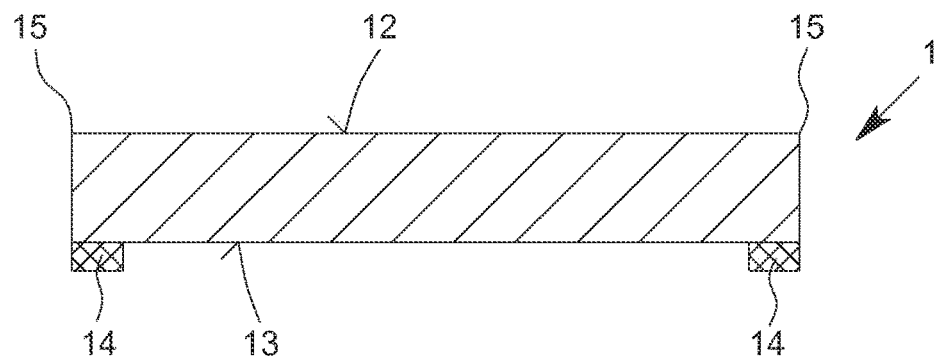
Figure 11:
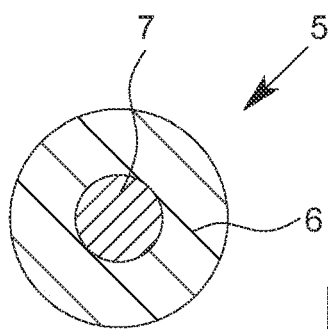
Figure 12:
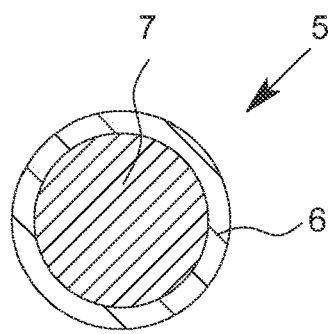
Figure 13:
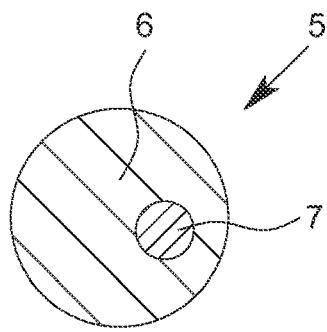
Figure 14:
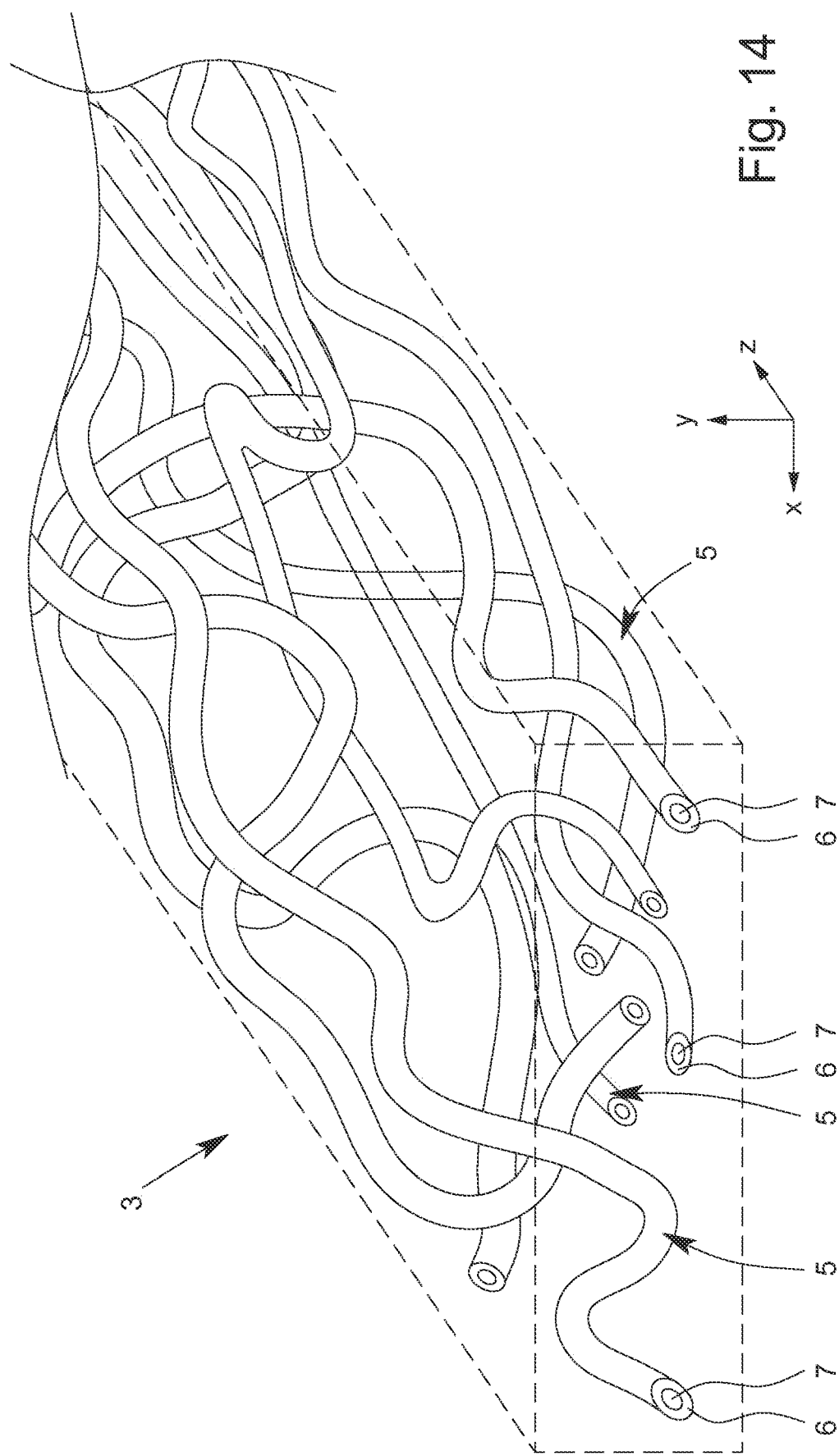

It shows:

FIG. 1 a schematic cross-sectional view of the composite film according to the invention, FIG. 2 schematic cross-sectional view of a further embodiment of the composite film according to the invention, FIG. 3 schematic cross-sectional view of a further embodiment of the composite film according to the invention, FIG. 4 schematic cross-sectional view of a further embodiment of the composite film according to the invention, FIG. 5 schematic cross-sectional view of a further embodiment of the composite film according to the invention, FIG. 6 schematic cross-sectional view of a further embodiment of the composite film according to the invention, FIG. 7 a schematic cross-sectional view of a further embodiment of the composite film according to the invention, FIG. 8 schematic and perspective cross-sectional view of a further embodiment of the composite film according to the invention, FIG. 9 schematic cross-sectional view of a further embodiment of the composite film according to the invention, FIG. 10 schematic cross-sectional view of a further embodiment of the composite film according to the invention, FIG. 11 cross-sectional view of an embodiment of a bicomponent fiber according to the invention as a core-sheath fiber, FIG. 12 cross-sectional view of an embodiment of a bicomponent fiber according to the invention as a core-sheath fiber with a thin sheath, FIG. 13 cross-sectional view of a further embodiment of a bicomponent fiber according to the invention as a core-sheath fiber with an eccentrically arranged core, and FIG. 14 part of an exemplary spunbonded web according to the invention.

FIG. 1 shows a composite film 1 with an outer protective layer 3 and an inner protective layer 4. A functional layer 2 is arranged between the outer protective layer 3 and the inner protective layer 4. The composite film 1 shown is intended for use in the construction industry and for use as a construction film, in particular for covering buildings and/or for use as a roofing membrane.

The functional layer 2 shown in FIG. 1 is designed as at least a single-layer membrane layer. The outer protective layer 3 and the inner protective layer 4 are formed as nonwoven layers comprising polyolefin. In the embodiment example shown in FIG. 1, the outer protective layer 3 has at least one bicomponent fiber 5 (not shown, see FIG. 14)—in the embodiment example shown, a plurality of bicomponent fibers 5. The bicomponent fiber 5 has a first component 6 and a second component 7, the first component 6 having a first polymer and the second component 7 having a second polymer as a constituent. The first polymer and the second polymer may be different from each other in the illustrated embodiment.

In particular, the outer protective layer 3 and/or the inner protective layer 4 can be firmly bonded and/or fully bonded to the functional layer 2.

In another embodiment not shown, it is provided that the first polymer comprises polypropylene, in particular polymerized by a Ziegler-Natta catalyst, and the second polymer comprises polypropylene, in particular produced by metallocene catalysts, or vice versa.

In the embodiment example shown in FIG. 2, it is provided that the inner protective layer 4 comprises the at least one bicomponent fiber 5. In further embodiments, both the outer protective layer 3 and the inner protective layer 4 can be formed as a nonwoven layer comprising bicomponent fibers 5.

Insofar as the composite film 1 is used for weather protection of goods, the topside 12 may face the weather side or the weather, whereas the underside 13 may face the interior of a building, for example. The topside 12 is arranged on the outer side of the outer protective layer 3. The underside 13 is provided on the opposite outer side of the composite film 1. In principle, it is also possible not to expose the composite film 1 to the weather, in which case the underside 13 may face the goods, material or the like to be covered.

The functional layer 2 shown in FIG. 1 is designed as a monolithic membrane layer. A monolithic membrane layer is a selectively permeable membrane layer that is pore-free or closed-cell.

The functional layer 2 has plastic and/or synthetic resin as the material. In particular, an elastomeric material and/or a thermoplastic material is provided. In the embodiment example shown in FIG. 1, the functional layer 2 has a polyurethane plastic. In the embodiment example shown, the polyurethane plastic of the functional layer 2 is a thermoplastic polyurethane (TPU). In further embodiments, the functional layer 2 may not only comprise the thermoplastic polyurethane, but may also comprise it.

In addition, the functional layer 2 shown in FIG. 1 has a basis weight or grammage of less than 100 $g/m^2$. In particular, the basis weight of the functional layer 2 is between 5 $g/m^2$ and 25 $g/m^2$.

FIG. 2 shows that the functional layer 2 has at least two layers of membrane layers—that is, two membrane layers 8. In the embodiment example shown, the membrane layers 8 are formed differently from one another and have, in particular, a different material composition and/or a different grammage.

In particular, the membrane layers 8 are firmly bonded to each other, proferably via a full-surface adhesive bond.

FIG. 3 shows that the functional layer 2 has a three-layer structure consisting of three membrane layers 8. In the embodiment example shown, the outer membrane layers 9 are of identical design and include a central membrane layer 8 having a different material composition and/or surround a central membrane layer 8. The identical design of the outer membrane layers 9 is to be understood as meaning that they have at least substantially the same material composition, the same material and/or the same material properties. In particular, the outer membrane layers 9 have the same functional design. In a further, not shown embodiment example, it can be provided that the membrane layers 8 differ from each other, so that also the outer membrane layers 9 are formed differently from each other.

In an embodiment not shown, the outer membrane layers 9 are identical, with the topside 12 and the underside 13 being functionally identical, in particular with the outer protective layer 3 being identical and/or functionally identical to the inner protective layer 4.

In another embodiment not shown, the composite film 1 has a symmetrical structure.

The outer membrane layer 9 is to be understood as the membrane layer 8 directly facing the outer protective layer 3 or the inner protective layer 4.

The functional layer 2 shown in FIG. 3 is designed in such a way that at least one membrane layer 8 comprises thermoplastic copolyester (TPEE) and/or thermoplastic polyurethane (TPU) as material and/or consists thereof. In particular, the outer membrane layer 9 has thermoplastic copolyester and/or thermoplastic polyurethane. In a further, not shown embodiment example, the functional layer 2 is formed of TPEE layers and/or TPU layers, wherein the layers can be firmly bonded to each other.

It is not shown that at least one outer membrane layer 9 and/or the inner membrane layer 8 of the multilayer functional layer 2 comprises and/or is formed from a foamed polymer. The outer membrane layer 9 comprising the foamed polymer can be bonded to the protective layer facing it—that is, either the outer protective layer 3 or the inner protective layer 4—by means of bonding. In particular, the outer-side membrane layer 9 comprising the foamed polymer penetrates the surface region or the outermost surface layer of the outer protective layer 3 and/or the inner protective layer 4. The interlocking may be achieved due to the manufacturing process of the composite film 1, in particular due to the slowed cooling caused due to the foaming of the outer-side membrane layer 9. Furthermore, the outer membrane layer 9 is also firmly bonded to the immediately adjacent membrane layer 8, wherein this bonding can also be caused by interlocking.

Furthermore, FIG. 3 shows that the outer protective layer 3 is formed as a nonwoven layer comprising polypropylene. In particular, the outer protective layer 3 is formed as a polypropylene needle-punched nonwoven layer—that is, a nonwoven layer consolidated by needle-punching. In further embodiments not shown, the inner protective layer 4 can additionally or alternatively be formed as a nonwoven layer comprising and/or consisting of polypropylene, in particular a polypropylene needle punched nonwoven layer.

FIG. 4 shows that the outer protective layer 3 and the inner protective layer 4 are formed as a spunbonded layer. In further embodiments, which are not shown, either the outer protective layer 3 or the inner protective layer 4 can be formed as a spunbonded layer. FIG. 14 shows the outer protective layer 3 in the form of a spunbonded layer, which is also composed of bicomponent fibers 5 each having a first component 6 and a second component 7.

In the embodiments shown in FIGS. 1 to 5, the outer protective layer 3 and the inner protective layer 4 have a grammage of less than 250 g/m$^2$. In particular, the grammage of the outer protective layer 3 and/or the inner protective layer 4 is between 30 g/m$^2$ and 100 g/m$^2$.

In principle, various consolidation methods, such as mechanical, chemical and/or thermal consolidation, can be provided for consolidating the outer protective layer 3 and the inner protective layer 4. FIG. 5 shows a thermally consolidated outer protective layer 3.

FIG. 4 shows that the functional layer 2 is firmly connected to the outer protective layer 3 and the inner protective layer 4. The fixed connection of the functional layer 2 to the protective layers 3, 4 is provided over the entire surface via the connecting surfaces. In further embodiments, a partial-surface connection of the functional layer 2 to the outer protective layer 3 and/or the inner protective layer 4 may also be provided. In addition, FIG. 4 shows that the functional layer 2 is bonded to both the outer protective layer 3 and the inner protective layer 4. The bonding and/or adhesive layer and/or adhesion-promoting layer 10 or bonding layer is designed in particular in such a way that the composite film is and/or remains open to diffusion, in particular wherein a very thin adhesive layer application and/or a screen application of the adhesive is carried out.

For bonding the functional layer 2 to the protective layers 3, 4, an adhesion-promoting layer 10 is provided, which comprises an adhesion promoter polymer. FIGS. 4 to 6 show the different arrangement of the adhesion-promoting layer 10. For example, the adhesion-promoting layer 10—as shown in FIG. 5—can be formed as part of the functional layer 2 and/or the adhesion promoter polymer penetrates at least in some areas into the surfaces of the functional layer 2 facing the protective layers 3, 4.

FIG. 4 shows that the adhesion-promoting layer 10 is formed as a separate layer provided between the functional layer 2 and the protective layers 3, 4. This adhesion-promoting layer 10 can be applied to the protective layers 3, 4 and/or to the functional layer 2 during the manufacturing process of the composite film 1.

FIG. 6 again shows that the adhesion-promoting layer 10 is formed as part of the protective layers 3, 4. Thus, FIG. 6 shows that the adhesion promoter polymer has penetrated into the surface areas of the protective layers 3, 4 facing the functional layer 2.

In particular, the adhesion-promoting layer 10 is provided as a component of the protective layer or protective layers 3, 4 comprising the bicomponent fibers 5. The adhesion-promoting layer 10 is firmly bonded to the functional layer 2 or the protective layers 3, 4, in particular over the entire surface. The adhesion promoter polymer or the material of the adhesion-promoting layer 10 may be a plastic and/or a synthetic resin, preferably polyurethane.

The composite film 1 shown in FIG. 6 is designed to be permeable to water vapor, open to diffusion and rainproof. In further embodiments, the composite film 1 may be water vapor permeable, diffusion open, windproof, rainproof, water repellent and/or waterproof. The composite film 1 shown in FIG. 6 has an Sd value of less than or equal to 0.5 m. In further embodiments, the Sd value of the composite film 1 may be between 0.01 m to 0.1 m. The Sd value of the composite film 1 is such that the diffusion-open properties of the composite film 1 and/or the functional layer 2 can be adequately ensured.

Furthermore, in the embodiment shown in FIG. 6, the composite film 1 has a tear strength of greater than 50 N/mm. In further embodiments, the tear strength of the composite film 1 may be between 100 N/mm to 300 N/mm. In the embodiment example shown in FIG. 6, the tear propagation strength of the composite film 1 is greater than 50 N/mm. In further embodiments not shown, the tear propagation strength of the composite film 1 is between 100 N/mm to 300 N/mm.

FIG. 7 shows that a reinforcing layer 11 is introduced in the layer structure of the composite film 1. In the illustrated embodiment example, the reinforcing layer 11 is arranged between the outer protective layer 3 and the functional layer 2. In further embodiments not shown, the reinforcing layer 11 may be arranged between the inner protective layer 4 and the functional layer 2. The reinforcing layer 11 is formed as a leno fabric. Furthermore, the reinforcing layer 11 may comprise and/or consist of plastic and/or synthetic resin as the material. In particular, the reinforcing layer 11 has and/or consists of a plastic polymer, such as polypropylene (PP) and/or polyethylene terephthalate (PET).

FIGS. 8 to 10 show that the composite film 1 has at least one longitudinal edge-side adhesive zone 14. The longitudinal edge-side adhesive zone 14 is provided on the topside 12 and/or on the underside 13 of the composite film 1. FIG. 8 shows that the longitudinal edge-side adhesive zone 14 is spaced from the longitudinal edge 15 of the composite film 1.

It is not shown that the adhesive zone 14 is strip-shaped. Furthermore, it is not shown that the adhesive zone 14 can also be formed as interrupted strips.

The width of the adhesive zone 14 in the illustrated embodiment is between 2 to 10 cm.

FIG. 8 shows that in each case one adhesive zone 14 is provided on the topside 12 and on the underside 13. FIG. 9 shows that in each case two longitudinal edge-side adhesive zones 14 are provided both on the underside 13 and on the topside 12 of the composite film 1. FIG. 10 shows that two longitudinal edge-side adhesive zones 14 are provided on the underside 13.

In FIG. 8, the adhesive zone 14 is arranged in a longitudinal edge region, which comprises the longitudinal edge 15, of the topside 12 and the underside 13 of the composite film 1. In the embodiment example shown in FIG. 8, the longitudinal edge region extends from the longitudinal edge 15 of the composite film 1 over or greater than 1% of the width of the composite film 1, in the embodiment example shown over about 15%+/−10% of the width of the composite film 1. FIGS. 8 to 10 only schematically show the arrangement of the adhesive zones 14 and do not serve to draw conclusions for the dimensions for the lengths or widths of the adhesive zone 14.

The adhesive zones 14 shown in the illustrated embodiments are formed such that when adjacent composite films 1 are bonded together, wind-tight and/or airtight bonding occurs.

The offset of the adhesive zones 14 shown in FIG. 8 is selected in such a way that, when adjacent composite films 1 are bonded, an adhesive-in-adhesive bond is produced between the adhesive zones 14 of adjacent rows of the composite film 1. In the case of the laid composite film 1, it is provided that the adhesive zones 14 are arranged one above the other, at least in certain regions, so that an adhesive-in-adhesive bond is produced between the adhesives of the adhesive zones 14. Ultimately, it may be provided that different adhesives and/or adhesive properties, such as grammage and/or width of the adhesive application, are provided for different adhesive zones 14, it being preferred that the adhesive zones 14 are identical with respect to the adhesive used and all adhesive properties.

It is not shown that the mating surface for the adhesive zone 14 comprising the adhesive is covered with a liner and/or surface-treated. In particular, it is not shown that the adhesive zone 14 may be covered by a lacquer. The liner may serve to protect the adhesive zone 14, in particular from impurities and/or from contamination.

FIGS. 11 to 13 show cross-sectional views of exemplary bicomponent fibers 5 according to the invention. The bicomponent fibers 5 shown each have a first component 6 and a second component 7. In the case of the core-sheath fibers shown in FIGS. 11 to 13, the first component 6 surrounds the second component 7 and thus forms the outer surface of the bicomponent fiber 5. In cross section, the bicomponent fibers 5 shown have an at least approximately circular and/or round geometry. In further embodiments not shown, the bicomponent fiber 5 may also have non-circular cross-sections, for example a trilobal cross-section or other multilobal cross-sections. In the case of a very thin sheath of the bicomponent fiber 5 surrounding the second component 7, the sheath may well have defects. That is, the sheath does not completely surround the core, but is broken in some places, so that the core also forms the outer surface of the fiber in these places. Such fibers are also "core-sheath fibers". In particular, in such fibers, the component forming the openwork sheath forms the outer surface of the fiber within the meaning of the present invention.

Not shown is that the bicomponent fiber 5 may also be formed as a side-by-side fiber. Side-by-side fibers may be characterized in that both the first component 6 and the second component 7 form part of the outer surface of the bicomponent fiber 5. Circular or at least approximately circular cross-sections are also possible for side-by-side fibers, as are multilobal cross-sections. Depending on which fiber properties and/or nonwoven properties are to be achieved, the first component 6 and the second component 7 can be combined in different ratios in different spatial arrangements relative to one another.

Also not shown is that the bicomponent fiber 5 may also be formed as a segmented-pie fiber. This fiber structure has a relationship to side-by-side fiber structures in that both the first component 6 and the second component 7 can form part of the outer surface of the bicomponent fiber 5.

Also, a design of the bicomponent fiber 5 as an Island-In-The-Sea structure as a modification of a core-cladding fiber is not provided in the embodiments shown. In an Island-In-The-Sea structure of the bicomponent fiber 5, a plurality of cores from the second component 7 may be present. The individual cores from the second component 7 are surrounded by a common sheath from the first component 6.

Furthermore, mixed forms between core-sheath fibers and side-by-side fibers are possible in principle.

FIG. 14 shows how a plurality of exemplary bicomponent fibers 5 form a spunbonded fabric. In the embodiment shown, the spunbonded fabric is formed as an outer protective layer 3. The inner protective layer 4 can also be formed as a spunbonded fabric shown in FIG. 14. In this case, the spunbonded fabric forms a web with a transverse direction X, a thickness direction Y and a length direction Z, which is also referred to as the machine direction.

An exemplary spunbonded fabric may be made from bicomponent fibers 5 that have been thermally bonded by means of a calendar. In the illustrated embodiment example, the bicomponent fibers 5 are core-sheath fibers having a sheath of the first component 6 with polypropylene as the first polymer with a core of the second component 7 with a polypropylene as the second polymer. The grammage of the spunbonded web shown in FIG. 14 may be 70 g/m$^2$+/−20 g/m$^2$.

Not shown is that the difference in the melting point of the first component 6 and the second component 7 is less than or equal to 8° C. In particular, the difference in the melting points of the first component 6 and the second component 7 can range from 1° C. to 6° C.

Furthermore, it is not shown that the melt flow indices of the first component 6 and the second component 7 are less than or equal to 25 g/10 min. In addition, the melt flow indices of the first component 6 and the second component 7 can each be less than or equal to 50 g/10 min.

In particular, the component with the low melting point in the cross-section of the bicomponent fiber 5 may form the outer surface of the bicomponent fiber 5, in particular surrounding preferably completely, the component with the higher melting point.

The polymer of one of the two components 6, 7 may have been polymerized with a metallocene catalyst. The polymer of the other component may have been polymerized with a Ziegler-Natta catalyst and subsequently subjected to a vis-breaking treatment.

Furthermore, it is not shown that the first component 6 comprises an additive, wherein the mass fraction of the additive in the second component 7 is smaller than in the first component 6, preferably at most 66.6%.

The additive may be a primary or secondary antioxidant, a UV absorber, a UV stabilizer, a flame retardant, an antistatic agent, a lubricant, a metal deactivator, a hydrophilizing agent, a hydrophobizing agent, an anti-fogging additive, and/or a biocide.

Where appropriate, the additive may be selected from the group consisting of:

Sterically hindered phenols, aromatic secondary or tertiary amines, aminophenols, aromatic nitro or nitroso compounds, organic phosphites or phosphonates, thioethers, thioalcohols, thioesters, sulfides and sulfur-containing organic acids, dithiocarbamates, thiodipropionates, aminopyrazoles, metal-containing chelates, mercaptobenzimidazoles, hydroxybenzophenones, cinnamates, oxalanilides, salicylates, resorcinol monobenzoates, benzotriazoles, triazines, benzophenones, titanium dioxide, carbon black, metal-containing complexes of organic sulfur or phosphorus compounds, sterically hindered amines (HALS), metal hydroxides, borates, organic bromine- or chlorine-containing compounds, organic phosphorus compounds, antimony trioxide, melamine, melamine cyanurate, expandable graphite or other intumescent systems, quaternary ammonium salts, alkyl sulfonates, alkyl sulfates, alkyl phosphates, dithiocarbamates, (alkaline earth) metal carboxylates, polyethylene glycols and their esters and ethers, ethoxylates, mono- and diglycerides, fatty alcohols, esters of fatty alcohols, fatty acids, fatty acid esters, dicarboxylic acid esters, fatty acid amides, metal salts of fatty acids, polyolefin waxes, natural or artificial kerosenes and derivatives thereof, fluoropolymers and fluoroligomers, antiblocking agents such as silicas, silicones, silicates, calcium carbonate, amides of mono- and dicarboxylic acids and their derivatives, cyclic amides, hydrazones and bishydrazones, hydrazides, hydrazines, melamine and its derivatives, benzotriazoles, aminotriazoles, sterically hindered phenols in combination with complexing metal compounds, benzylphosphonates, pyridithiols, thiobisphenol esters, polyglycols, ethoxylates, fluoropolymers and fluoroligomers montan waxes, in particular stearates, 10,10'-oxybisphenoxarsine (OBPA), N-(trihalogen-methylthiol)phthalimide, tributyltin oxide, zinc dimethyldithiocarbamate, diphenylantimony-2-ethylhexanoate, copper-8-hydroxyquinoline, isothiazolones, silver and silver salts as biocides or mixtures thereof.

Furthermore, it is not shown that the first polymer and/or the second polymer is a polyolefin or a polyolefin copolymer, preferably a polymer and/or copolymer of ethylene, propylene, butylene, hexene or octene and/or a mixture and/or a blend thereof, and/or a polyethylene terephthalate and/or a polyethylene terephthalate copolymer.

The mass fraction of the component with the low melting point in the bicomponent fiber 5 can be at most 50%.

LIST OF REFERENCE SIGNS

1 Composite film
2 Functional layer
3 outer protective layer
4 inner protective layer
5 Bicomponent fiber
6 first component
7 second component
8 Membrane layer
9 external membrane layer
10 Adhesion-promoting layer
11 Reinforcement layer
12 Topside
13 Underside
14 Adhesive zone
15 Longitudinal edge

The invention claimed is:

1. A composite construction film comprising:
at least one functional layer, at least one outer protective layer and at least one inner protective layer, the functional layer being arranged between the outer protective layer and the inner protective layer,
wherein
the composite film is open to diffusion,
the at least one functional layer includes thermoplastic polyurethane (TPU),
the at least one functional layer is formed as at least a single-layer membrane layer, that the outer protective layer and the inner protective layer are formed as a nonwoven layer comprising polyolefin, and in that the outer protective layer and/or the inner protective layer comprises at least one bicomponent fiber with a first component and a second component, the first component comprising a first polymer and the second component comprising a second polymer.

2. The composite film according to claim 1, wherein the at least one functional layer is a monolithic membrane layer.

3. The composite film according to claim 1, wherein the at least one functional layer comprises one or more of: plastic, synthetic resin, an elastomeric material, a thermoplastic material, and/or a polyurethane plastic.

4. The composite film according to claim 1, wherein the at least one functional layer has a grammage of: less than 100 g/m², between 1 g/m² to 70 g/m², between 3 g/m² to 40 g/m², between 4 g/m² to 30 g/m² or between 5 g/m² to 25 g/m².

5. The composite film according to claim 1, wherein the at least one functional layer comprises at least two membrane layers, wherein the at least two membrane layers are formed differently or the at least two membrane layers are formed at least substantially identically.

6. The composite film according to claim 1, wherein at least one membrane layer of the at least one functional layer, that is an outer membrane layer facing the outer protective layer and/or inner protective layer, includes thermoplastic copolyester (TPEE) and/or thermoplastic polyurethane (TPU) and/or the at least one functional layer is formed from TPEE layers and/or TPU layers.

7. The composite film according to claim 1, wherein at least one outer membrane layer and/or one inner membrane layer of the at least one functional layer comprises a foamed polymer, wherein the at least one outer membrane layer is bonded to the outer and/or inner protective layer.

8. The composite film according to claim 1, wherein the at least one outer protective layer and/or the at least one inner protective layer is formed as a nonwoven layer comprising polypropylene or as a polypropylene needlefelt layer.

9. The composite film according to claim 1, wherein the at least one outer protective layer and/or the at least one inner protective layer is formed as a spunbonded layer.

10. The composite film according to claim 1, wherein the grammage of the at least one outer protective layer and/or of the at least one inner protective layer is: less than or equal to 250 g/m², between 1 g/m² and 250 g/m², between 10 g/m² and 150 g/m², between 20 g/m² and 120 g/m², or between 30 g/m² and 100 g/m².

11. The composite film according to claim 1, wherein the at least one outer protective layer and/or the at least one inner protective layer is formed as a mechanically, chemically and/or thermally, consolidated nonwoven layer.

12. The composite film according to claim 1, wherein the at least one functional layer is firmly bonded, or glued, to the outer protective layer and/or the inner protective layer.

13. The composite film according to claim 1, wherein the at least one outer protective layer and/or the at least one inner protective layer, comprising the at least one bicomponent fiber, and/or an outer functional layer, has an adhesion-promoting layer comprising a polymer, wherein the adhesion-promoting layer is firmly bonded to the functional layer and/or wherein the adhesion-promoting layer comprises a plastic and/or a synthetic resin, and/or a polyurethane.

14. The composite film according to claim 1, wherein the composite film is permeable to water vapor, windproof, rainproof, water-repellent and/or waterproof, and wherein the composite film has an Sd value of: less than or equal to 0.5 m, 0.008 m to 0.5 m, 0.009 m to 0.2 m, or 0.01 m to 0.1 m.

15. The composite film according to claim 1, wherein the tear strength of the composite film is: greater than 50 N/mm, between 50 N/mm to 600 N/mm, or between 100 N/mm to 400 N/mm, and/or that the tear propagation strength of the composite film is: greater than 50 N/mm, between 50 N/mm and 500 N/mm, or between 100 N/mm to 300 N/mm.

16. The composite film according to claim 1, wherein at least one reinforcing layer is arranged between the at least one functional layer and the at least one outer protective layer and/or the at least one inner protective layer, the reinforcing layer being a leno fabric, the reinforcing layer comprising a plastic and/or synthetic resin, a plastic polymer, a polypropylene (PP) and/or polyethylene terephthalate (PET).

17. The composite film according to claim 1, wherein at least one longitudinal-edge-side adhesive zone is provided on a topside and/or an underside of the composite film, the longitudinal-edge-side adhesive zone being spaced apart from a longitudinal edge of the composite film, and/or the adhesive zone being in the form of strips or as interrupted strips, and/or the adhesive zone having a width of between 2 and 10 cm.

18. The composite film according to claim 1, wherein a difference in melting points of the first component and the second component is less than or equal to 8° C., wherein the difference in the melting points of the first component and the second component is at most 6° C., between 1° C. to 8° C., or between 1° C. to 6° C.

19. The composite film according to claim 1, wherein a difference between melt flow indices of the first component and the second component is: less than or equal to 25 g/10 min, less than or equal to 20 g/10 min, or 15 g/10 min.

20. The composite film according to claim 1, wherein melt flow indices of the first component and the second component are each less than or equal to 50 g/10 min, or each less than or equal to 40 g/10 min.

21. The composite film according to claim 1, wherein the first component or the second component with a lower melting point in a cross-section of the bicomponent fiber forms an outer surface of the bicomponent fiber, and at least partially surrounds the component with a higher melting point.

22. The composite film according to claim 1, wherein the polymer of one of the first component or the second component has been polymerized with a metallocene catalyst.

23. The composite film according to claim 22, wherein the polymer of the other of the first component or the second component has been polymerized with a Ziegler-Natta catalyst and subjected to a subsequent visbreaking treatment.

24. The composite film according to claim 1, wherein the first component comprises an additive, a mass fraction of the additive in the second component being smaller than in the first component, wherein the mass fraction is: at most 66.6%, at most 50%, or at most 33.3%, of the mass fraction of the additive in the first component.

25. The composite film according to claim 24, wherein the additive is a primary or secondary antioxidant, a UV absorber, a UV stabilizer, a flame retardant, an antistatic agent, a lubricant, a metal deactivator, a hydrophilizing agent, a hydrophobizing agent, an anti-fogging additive and/or a biocide.

26. The composite film according to claim 24, wherein the additive is selected from the group of:
sterically hindered phenols, aromatic secondary or tertiary amines, aminophenols, aromatic nitro or nitroso compounds, organic phosphites or phosphonates, thioethers, thioalcohols, thioesters, sulfides and sulfur-containing organic acids, dithiocarbamates, thiodipropionates, aminopyrazoles, metal-containing chelates, mercaptobenzimidazoles, hydroxybenzophenones, cinnamates, oxalanilides, salicylates, resorcinol monobenzoates, benzotriazoles, triazines, benzophenones, titanium dioxide, carbon black, metal-containing complexes of organic sulfur or phosphorus compounds, sterically hindered amines (HALS), metal hydroxides, borates, organic bromine- or chlorine-containing compounds, organic phosphorus compounds, antimony trioxide, melamine, melamine cyanurate, exfoliated graphite or other intumescent systems, quaternary ammonium salts, alkyl sulfonates, alkyl sulfates, alkyl phosphates, dithiocarbamates, (alkaline earth) metal carboxylates, polyethylene glycols and their esters and ethers, ethoxylates, mono- and diglycerides, fatty alcohols, esters of fatty alcohols, fatty acids, fatty acid esters, dicarboxylic acid esters, fatty acid amides, metal salts of fatty acids, polyolefin waxes, natural or artificial kerosenes and their derivatives, fluoropolymers and fluoroligomers, antiblocking agents, silicas, silicones, silicates, calcium carbonate, amides of mono- and dicarboxylic acids and their derivatives, cyclic amides, hydrazones and bishydrazones, hydrazides, hydrazines, melamine and its derivatives, benzotriazoles, aminotriazoles, sterically hindered phenols in combination with complexing metal compounds, benzylphosphonates, pyridithiols, thiobisphenol esters, polyglycols, ethoxylates, fluoropolymers and fluoroligomers montan waxes, stearates, 10,10'-oxybisphenoxarsine (OBPA), N-(trihalogen-methylthiol)phthalimide, tributyltin oxide, zinc dimethyldithiocarbamate, diphenylantimony-2-ethylhexanoate, copper-8-hydroxyquinoline, isothiazolones, silver and silver salts as biocides or mixtures thereof.

27. The composite film according to claim 1, the first polymer and/or the second polymer is: a polyolefin or a polyolefin copolymer, a polymer and/or copolymer of ethylene, propylene, butylene, hexene or octene and/or a blend and/or a blend thereof, and/or a polyethylene terephthalate and/or a polyethylene terephthalate copolymer.

28. The composite film according to claim 1, wherein a mass fraction of the first component or the second component with a lower melting point in the bicomponent fiber is: at most 50%, at most 25%, at most 10%, or at most 5%.

29. An open-diffusion construction film comprising:
at least one functional layer;
at least one outer protective layer; and
at least one inner protective layer,
wherein:
    the at least one functional layer is positioned between the at least one outer protective layer and the at least one inner protective layer,
    the film is open to diffusion,
    the at least one functional layer includes thermoplastic polyurethane,
    the at least one functional layer is at least a single-layer membrane layer,
    the at least one outer protective layer and the at least one inner protective layer are formed as a nonwoven layer comprising polyolefin,
    one or more of the outer protective layer and/or the inner protective layer comprises at least one bicomponent fiber including a first component and a second component, wherein the first component comprises a first polymer, and the second component comprises a second polymer.

\* \* \* \* \*